United States Patent [19]

Briffod

[11] Patent Number: 4,977,303
[45] Date of Patent: Dec. 11, 1990

[54] ZINC OR CADMIUM COATED, SURFACE OXIDIZED ELECTRODE WIRE FOR EDM CUTTING OF A WORKPIECE; AND METHOD FOR FORMING SUCH A WIRE

[75] Inventor: Jean Briffod, Lucinges, France

[73] Assignee: Charmilles Technologie S.A., Geneva, Switzerland

[21] Appl. No.: 206,136

[22] Filed: Jun. 13, 1988

Related U.S. Application Data

[63] Continuation-in-part of Ser. No. 644,966, Aug. 28, 1984, abandoned.

[51] Int. Cl.[5] .............................................. B73H 7/08
[52] U.S. Cl. ................... 219/69.12; 148/240; 148/277; 204/280; 427/59; 427/117; 427/120
[58] Field of Search ................ 427/59, 117, 118, 120, 427/175, 377; 148/240, 241, 269, 277, 282, 287; 219/69 W, 69 E; 204/280

[56] References Cited

U.S. PATENT DOCUMENTS

| Re. 21,903 | 9/1941 | Brenneisen | 148/240 |
|---|---|---|---|
| 2,383,118 | 8/1945 | Ferenci | 205/21 |
| 3,478,552 | 11/1969 | Dane | 427/59 |
| 3,664,169 | 5/1972 | Henrich | 72/278 |
| 4,250,371 | 2/1981 | Haug et al. | 219/69 W |
| 4,287,404 | 9/1981 | Convers et al. | 219/69 W |
| 4,341,939 | 7/1982 | Briffod et al. | 219/69 W |
| 4,418,263 | 11/1983 | Inoue | 219/69 W |

FOREIGN PATENT DOCUMENTS

| 2922206 | 12/1979 | Fed. Rep. of Germany | 219/69 E |
|---|---|---|---|
| 44-02280 | 1/1969 | Japan | |
| 56-91308 | 12/1979 | Japan | |
| 59-50143 | 9/1982 | Japan | |
| 59-129629 | 1/1983 | Japan | |
| 59-134623 | 1/1983 | Japan | |
| 59-127921 | 7/1984 | Japan | 427/117 |

Primary Examiner—A. D. Pellinen
Assistant Examiner—Geoffrey S. Evans
Attorney, Agent, or Firm—Gifford, Groh, Sprinkle, Patmore and Anderson

[57] ABSTRACT

A method for forming an EDM wire electrode includes coating a copper wire core with zinc, and then heating the coated wire in an oxidizing atmosphere to simultaneously provide a copper-zinc alloy layer over the copper core and a zinc oxide surface on the alloy layer. The oxide- and alloy-coated wire is then reduced in diameter to reduce the thickness of the alloy layer by about one-half of its initial thickness. The resulting electrodes wire permits a greater current density and a greater tractional force to be employed, yielding a significantly greater machining speed in the EDM process.

34 Claims, 2 Drawing Sheets

ZINC OR CADMIUM COATED, SURFACE OXIDIZED ELECTRODE WIRE FOR EDM CUTTING OF A WORKPIECE; AND METHOD FOR FORMING SUCH A WIRE

CROSS REFERENCE TO RELATED APPLICATION

This application is a continuation-in-part of Applicant's copending Ser. No. 644,966, filed Aug. 28, 1984 now abandoned.

BACKGROUND OF THE INVENTION

I. Field of the Invention

The present invention relates to electrical discharge machining (EDM), and more particularly to an electrode tool in the form of a wire.

II. Description of the Prior Art

EDM methods involve the machining of a conductive workpiece through vaporization of a very small portion of the workpiece by a high frequency electric spark between the workpiece and an electrical discharge tool. One known EDM method involves a tool configured as a conductive metallic wire. The workpiece and the wire are displaced relative to one another, the wire for example being held in a particular location, and the workpiece disposed on a movable carriage and moved with respect to the wire. The characteristics of apparatus for performing such methods are well known, for example, as disclosed in U.S. Pat. No. 4,287,404 at column 1, lines 11 through 22, and U.S. Pat. No. 4,341,939 at column 1, lines 7 through 37.

It is also known to provide an oxidized surface on an EDM electrode wire by heating the wire in an oxidizing atmosphere prior to contacting the workpiece. However, this lessens the diameter of the conductive metal interior portion of the wire, and thereby lessens the current which can be carried by the wire without breakage or melting. The traction or pull which can be exerted on the wire tool is thus decreased. Since the machining speed of an EDM apparatus is dependent upon the current which can be carried by the electrode and the traction experienced by the electrode, such oxidizing treatment has not increased the machining speed to the degree expected.

Another attempt to increase the machining speed is disclosed in U.S. Pat. No. 4,287,404 and employs a wire tool having a metallic wire core of high mechanical strength (for example, steel) and a second metallic coating on the core, the coating having a low vaporization temperature. The second metallic coating is intended to protect the core against thermal shock from the electrical discharges, and thereby allow an increase in the power or frequency of the discharges. Such a wire electrode is disadvantageous, however, in that it readily short circuits with the workpiece, particularly when the metallic coating is thin. For example, the surface craters created by electrical discharges commonly employed in EDM apparatus are on the order of five micrometers in size, the same as the typical thickness of the metallic coating on the electrode wire. Moreover, the thin second metallic coating may have a poor electrical conductivity, which will also interfere with optimal operation of the apparatus. Nor is the tensile strength of the wire completely satisfactory. While the wire can be extruded through a die for sizing, the patent neither discloses nor suggests cold-drawing the coated wire an amount sufficient to improve its tensile strength while simultaneously decreasing the thickness of the metallic coating.

The invention disclosed in U.S. Pat. No. 4,341,939 attempted to solve these drawbacks by combining features of the two wire electrodes mentioned above. In that patent, the upper portion of a metallic coating on a wire core is oxidized by heating the wire at a temperature of about at least 600° C. One effect observed was that the core metal and coating metal diffuse into each other upon such heating, to form an alloy layer covered by a much thinner film of an oxide of the coating metal. For example, when the core metal is copper and the coating metal is zinc, the resulting wire includes a copper core covered by a layer of brass, in turn covered by zinc oxide. While the electrode wire disclosed in this patent has been found very useful in practice, its use occasionally still encounters some of the attendant drawbacks of each of the metal and oxide coatings applied in prior methods and is thus not always the optimal construction for EDM tool wires.

SUMMARY OF THE PRESENT INVENTION

Applicant has discovered that the utility of the electrode wire disclosed in U.S. Pat. No. 4,341,939 can be unexpectedly and significantly improved by first heat treating the metal-coated copper wire core at a temperature higher than that disclosed in the patent, for a time (typically on the order of five to ten seconds) sufficient to yield a diffused alloy layer having a thickness about three times that of the initial coat of metal; and then cold hammering, drawing or otherwise reducing the thickness of the wire sufficiently to reduce the thickness of the diffused alloy layer by about at least 30 per cent from its heat-formed thickness, preferably by about one-half of that thickness. This higher temperature is at least 700° C., and preferably between about 750° C. and 900° C.

The corresponding decrease in the area of the cross-section of the wire is about at least 20 percent. Unexpectedly, as a result of the reduction in diameter of the alloy and metal oxide coated wire, not only can the useful traction exerted on the wire through the machining zone be increased, but the machining speed can be increased a surprising degree as well. The observed results may be due to a structural or molecular modification causing hardening of the coating in the course of the step of reducing the diameter of the wire. Applicant, however, does not intend to be bound by any particular scientific theory as to how these advantages accrue; the important concern is that these advantages are achieved by the wire and method of the present invention, whatever may be occurring on the crystalline or molecular levels.

The resulting electrode wire formed by the combination of coating, heating, oxidizing and reducing in diameter permits an increase in useful current density and a higher speed of EDM machining than has been achieved with earlier electrode wires. For example, as a more specific comparison, if the oxide layer provided by the present invention is removed subsequent to the reduction in diameter, only about half the increase in speed from the present invention is lost; that is, the maximum useful cutting speed of the treated wire without its oxide coating is half way between that of an undrawn alloy wire and that of the fully treated wire.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 6:
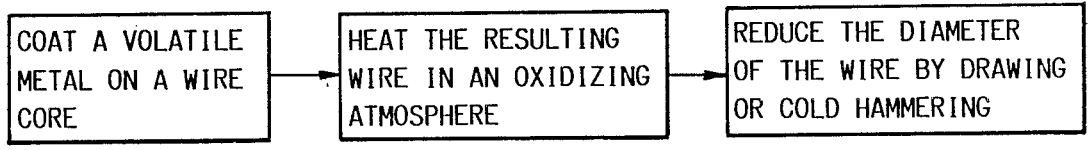
FIG. 6 is a flow chart of the preferred embodiment of the present invention.

As generally shown in FIG. 6, the method of the present invention for forming an EDM electrode wire comprises the steps of depositing a coating containing a volatile metal on a wire core containing a second substance; heating the resulting coated wire in an oxidizing atmosphere for a sufficient time and at a sufficiently high temperature to create an admixed layer of said first metal and said second substance atop the wire core, the admixed layer preferably having a thickness about three times that of the initial thickness of the metal coating, while simultaneously oxidizing the outer surface of the coating metal; and reducing the diameter of the resulting wire sufficiently to reduce the thickness of the admixed layer preferably by at least about 30 per cent of its initial thickness. More particularly, at least one of the coating metal and the core substance are selected so as to be capable of diffusing into the other upon heating, so as to form the admixed layer.

The relatively volatile first metal can be selected from the class consisting of cadmium, tin, lead, antimony and bismuth, but is preferably zinc The second substance, forming the core of the wire, can for example be steel, brass or carbon, but is preferably copper. The first metal coating has an initial thickness of about 5 to 20 micrometers, and preferably 13 to 15 micrometers, while the overall diameter of the coated wire is typically about 0.185 millimeters.

The method of the present invention then comprises the step of heating a coated wire of this type in an oxidizing atmosphere above about 700° C., so as to bring about the diffusion of at least one of the coating metal and the core substance into the other and simultaneously oxidize the outer surface of the coated wire. Preferably, the wire is heated to a temperature of about 750° C. to 900° C. for a sufficient time to create the admixed layer and provide the coating metal oxide covering. For example, the heating step is optimally performed at about 850° C. for about 8 seconds when the wire core is copper, coated with a 13 to 15 micrometer layer of zinc. In any event, however, the temperature and time of heating are selected in view of the particular materials selected for the coating metal and the core substance such that the admixed layer of the coating metal and core substance formed by the heating has an initial thickness about three times that of the initial thickness of the metal coating. Thus, when a zinc coating is applied over a copper core and heated under the preferred conditions described above, an admixed layer of zinc and copper is formed atop the core having a thickness preferably about 42 to 45 micrometers thick. Simultaneously, the uppermost portion of the admixed layer becomes covered with an oxide of the coating metal, preferably zinc dioxide (commonly referred to in the art as zinc oxide), due to the presence of the oxidizing atmosphere. When heated and oxidized under the preferred conditions described above, the zinc oxide layer is about 1 micrometer thick.

Thermal oxidation of metal coated wires is, by itself, known in this art; for example, as disclosed in U.S. Pat. No. 4,341,939. The disclosure of that patent is incorporated by reference herein, showing different conditions for bringing about the required oxidation.

The method of the present invention lastly comprises reducing the diameter of the resulting oxide-covered and admixed-layer covered wire a sufficient amount to reduce the thickness of the admixed layer by at least about 30 per cent of its initial thickness, preferably by at least 35 per cent of its initial thickness, and optimally by about one-half of its initial thickness. For example, when a zinc-coated copper wire is treated under the preferred conditions described above, the 42 to 45 micrometer zinc-copper alloy layer formed during the heating step is preferably reduced to a thickness of about 22 micrometers. The reduction in diameter can be carried out by cold hammering or otherwise forming the wire, but is preferably carried out by drawing the wire through at least one die dimensioned so as to bring about a reduction in the diameter of the admixed layer.

Figure 2:
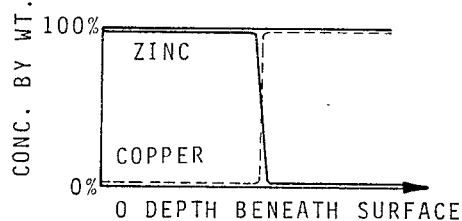
FIG. 2 is a phase diagram of the composition of the electrode wire of the preferred embodiment of the present invention, prior to heat treatment.
Figure 3:
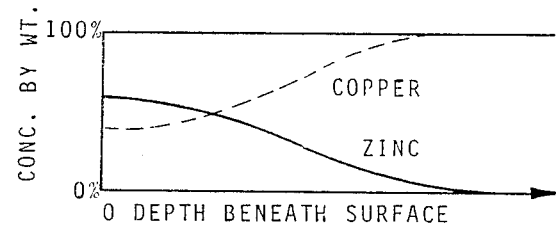
FIG. 3 is a phase diagram representing the composition of a zinc-coated copper core wire subsequent to heat treatment in an inert atmosphere, as known in the prior art.
Figure 4:
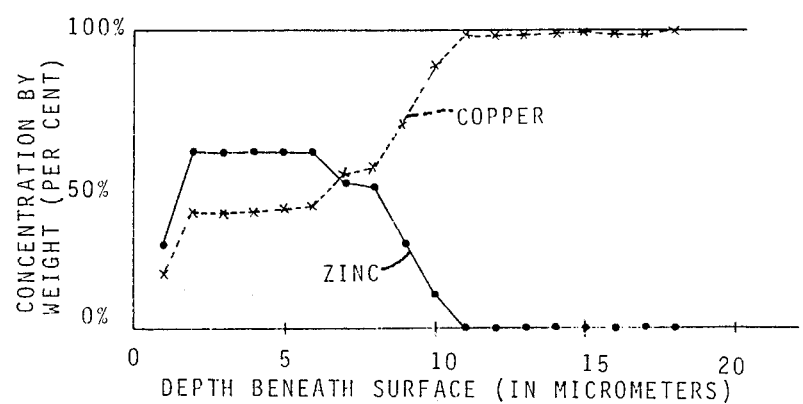
FIG. 4 is a phase diagram of the composition of a metal-coated electrode wire manufactured according to the preferred embodiment of the present invention.

FIGS. 2 through 4 disclose the dependence of the concentrations of the coating metal and core substance upon the depth beneath the surface of the coated wire at three points in the method. The phase diagram shown in FIG. 2 represents the initial concentration of, for example, zinc and copper (in percent by weight) in a wire having a zinc coating upon a copper core. The zinc and copper are substantially not fused with one another prior to heating, so that as the depth beneath the surface of the coated wire increases, only zinc is found to be present at first (in the coating layer), and an abrupt transition is made to substantially pure copper below the depth of the coating.

The phase diagram shown in FIG. 3 discloses the change in the amounts of zinc and copper (percent by weight) found in the outermost portion of a zinc-coated copper wire which is heated in an inert atmosphere, an atmosphere which does not oxidize either the copper or zinc. Upon such heating, the copper and zinc diffuse into one another, creating an admixed, alloy layer having a depth beneath the surface (i.e., a thickness), greater than that of the initial zinc coating layer. Although not shown in FIG. 3, when an oxidizing atmosphere is employed the very left-hand edge of each curve will taper downwardly indicating a lower percentage of each metal in the region immediately adjacent the surface of the wire, due to the presence of the oxidized covering; the included oxygen reduces the relative percentages of both metals in the oxide layer.

The consequence of employing an oxidizing atmosphere is more clearly shown in the phase diagram contained in FIG. 4, wherein the outermost micrometer or so of the zinc-copper alloy layer has been oxidized. In the absence of oxidation, the percentage of zinc in that layer, extending to a depth of about 6 micrometers beneath the surface of the coated wire, would be about 58 to 60 percent. At a depth of about 1 micrometer, however, the copper and zinc metals have been oxidized due to the presence of the oxidizing atmosphere. The concentrations and specific depths shown in FIG. 4 are those obtained after reduction of the diameter of the oxide coating and alloy layer in accordance with the method of the present invention.

Figure 1:
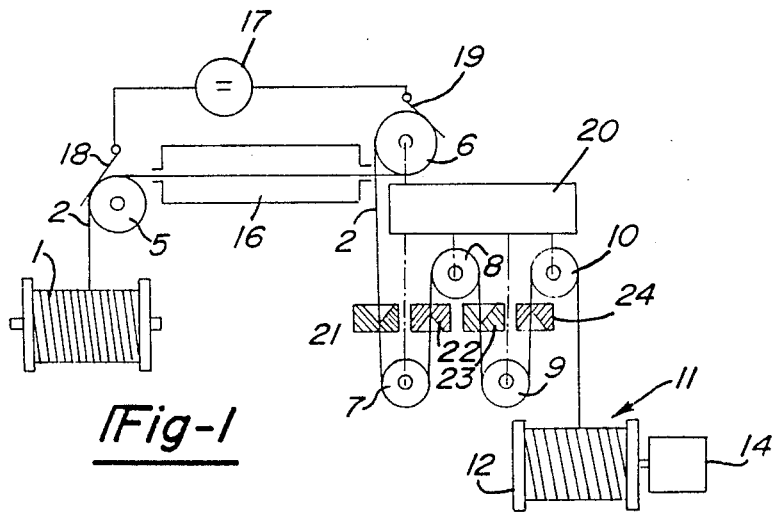
FIG 1 is a schematic representation of the preferred embodiment of the present invention.

With reference now to FIG. 1, an apparatus is there-shown schematically which is useful for manufacturing the EDM electrode wire of the present invention. The apparatus first comprises a rotatable spool 1 loaded with a metallic wire 2, the wire 2 comprising a coating containing a volatile metal on a wire core composed of a second substance. At least one of the coating metal and the core substance is capable of diffusing into the other upon heating. The metal coating is applied to an initial thickness of about 5 to 20 micrometers, and is placed upon the core substance in any conventional fashion, such as by electroplating, dipping or the like. The metal coating preferably comprises zinc, while the wire core preferably comprises copper. The wire 2 when treated will define a filiform or wire-like electrode for cutting a workpiece by an electrical erosive discharge, as is well known in the art.

With reference again to FIG. 1, after being unwound from the spool 1, the electrode wire 2 is passed over a series of rollers or pulleys 5 through 10, and onto a user assembly 11. The user assembly 11 can comprise a conventional EDM apparatus, employing the treated wire 2 as either a fixed or moving electrode wire; preferably, however, the wire 2 is manufactured at a location remote from the EDM apparatus, so that the user assembly 11 comprises a takeup spool 12 driven by a motor 14. The spool 12 and motor 14 maintain a tension or traction upon the wire 2 throughout the manufacturing process.

At a location between the rollers or pulleys 5 and 6, the electrode wire 2 is passed through an enclosure 16 in which it is heated by an electrical current supplied by a source 17 of electrical energy, the wire-heating current being supplied to the rollers or pulleys 5 and 6 by brush contacts 18 and 19. The enclosure 16 contains an oxidizing atmosphere, most preferably, air. The intensity of the heating current applied to the wire 2 is adjusted by an appropriate means included in the source 17 so as to heat the wire to a temperature of 750° C. to 900° C., preferably to about 850° C. At this temperature, the volatile metal coating is oxidized by direct contact with atmospheric oxygen, while at least one and preferably both of the coating metal and the wire core substance diffuse into one another, creating an admixed diffusion layer (preferably, an alloy layer) about three times as thick as the initial metal coating on the cold wire core.

Advantageously, the reduction in the thickness of the admixed layer so formed is initiated within the enclosure 16, by subjecting a portion of the wire 2 between the rollers or pulleys 5 and 6 to traction, thereby causing an increase in the length of the wire. For example, this traction can be applied by exerting a braking action upon the roller or pulley 5, while the roller or pulley 6 is driven by an appropriate drive mechanism 20. The drive mechanism 20 preferably also coordinates the rotational speeds of the rollers or pulleys 6 through 10, so as to continue to apply traction to the wire 2 as it is drawn through a series of four drawing dies 21 through 24, disposed respectively between sequential pairs of the pulleys or rollers 6 through 10.

The cross sections of the drawing dies progressively decrease from the first die 21 to the last die 24, while the pulley or roller driving mechanism 20 is arranged such that the rotational velocity of the rollers or pulleys 7 through 10 vary in dependence upon the elongation rate to which the wire 2 is subjected in the course of its passage through each drawing die 21 through 24. The result is that the wire 2, after passage through the last drawing die 24, has been subjected to a reduction in diameter sufficient to reduce the thickness of the admixed diffusion layer by at least about 30 percent of its initial thickness, preferably by about 35 percent of its initial thickness, and optimally by about one-half of its initial thickness. The corresponding decrease in the overall diameter of the wire is at least about 20 per cent. Of course, the reduction in diameter may be brought about by cold drawing of the wire, by cold rolling, or by a combination of both. The reduction in diameter may also be brought about by cold hammering. Following such operations, the treated wire can then be calibrated by means of a single draw die.

The last draw die 24 can be incorporated into an EDM apparatus, and serve as a support and guide member for disposition of the electrode wire 2 adjacent a workpiece to be treated, for example, in an EDM apparatus such as disclosed in U.S. Pat. No. 4,287,404, whose disclosure is incorporated by reference herein. Preferably, however, the pulley or roller 10 serves as a guide to facilitate takeup of the wire 2 on the takeup spool 12.

Figure 5:
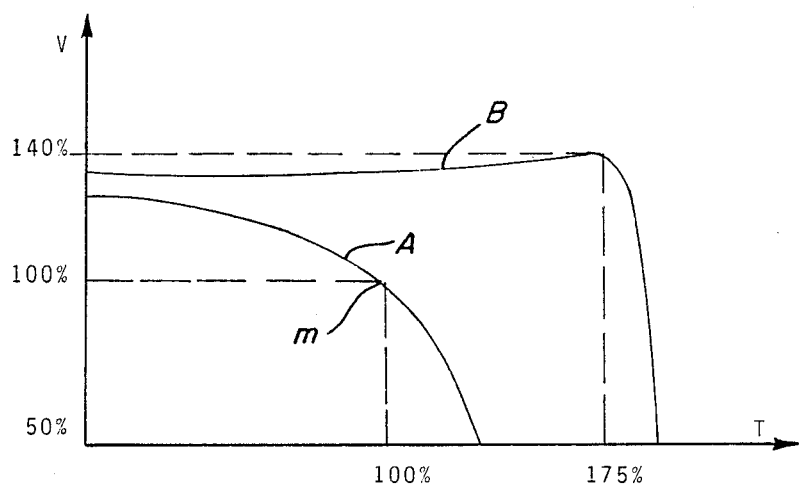
FIG. 5 is a diagram representing the improved results achieved by the present invention.

FIG. 5 illustrates the advantages of the method and wire of the present invention. Curve A represents the relationship between the machining speed V and the mechanical tractional force T exerted on the wire 2 in the machining zone. The point m on the curve a indicates a point, referenced for convenience as 100%, which corresponds to the optimum ratio between the intensity of the current that flows through the wire and the force of traction exerted on the wire needed to obtain a sufficiently precise cut in the workpiece. Consequently, the curve A generally accurately illustrates the maximum electrical current capable of flowing through the wire without causing a rupture of the wire, as a function of the tractional force exerted on the wire.

Curve B represents the results achieved by the invention. As shown, the optimal tractional force can be increased, for example, by 75% over that at point m, while the optimal current can be increased by 40% over that at point m, after the wire has been hardened in the course of passing through the four consecutive drawing dies 21 through 24. In particular, curve A represents a conventional electrode wire, while curve B represents a wire coated with a film of zinc oxide, the wire having a diameter of 0.185 mm and having been subjected to an overall decrease of 26% in diameter.

It should be appreciated by those skilled in the art that many modifications of the preferably described embodiment fall squarely within the scope of the invention. The relatively volatile coating metal can be either an elemental metal, or an alloy possessing at least one constituent which is relatively volatile. Similarly, the wire core can be an elemental material or a metal alloy. The resultant oxide covering on the diffusion layer formed upon heating can thus be a simple or complex oxide of either one or a plurality of materials.

Having disclosed my invention, however, many modifications thereto will become apparent to those skilled in the art to which it pertains, without deviation from the spirit of the invention, as defined by the scope of the appended claims.

I claim:

1. A method for forming a wire useful as an electrode tool in an EDM apparatus, comprising the steps of:
   depositing a coating containing a volatile metal selected from the group consisting of zinc, cadmium and alloys thereof on a wire core, said coating metal being capable of dissusing into a substance comprised in said core upon heating, so as to form an admixed layer on said core;
   heating the resulting coated wire in an oxidizing atmosphere at a temperature of at least 700° C. to diffuse at least one of said coating metal and said core substance into the other, and to create an admixed layer of said coating metal and said core substance, said admixed layer having a thickness of about three times that of said initial metal coating, while simultaneously oxidizing the outer surface of said coating metal; and
   reducing the diameter of the resulting wire sufficiently to reduce the thickness of said admixed layer by at least about 30 per cent of its initial thickness.

2. The invention according to claim 1, wherein said core substance is copper.

3. The invention according to claim 1, comprising reducing the thickness of said admixed layer by at least about 35 per cent of its initial thickness.

4. The invention according to claim 1, comprising reducing the thickness of said admixed layer by about one-half of its initial thickness.

5. The invention according to claim 1, wherein said heating step is carried out at about 850° C.

6. The invention according to claim 1, wherein said heating step is carried out for about 8 seconds.

7. The invention according to claim 1, wherein said core substance is a metal, whereby said admixed layer is an alloy layer.

8. The invention according to claim 1, wherein said reducing step is carried out by drawing said coated wire through at least one drawing die.

9. The invention according to claim 1, wherein said reducing step is carried out by cold hammering said coated and covered wire.

10. The invention according to claim 1, wherein said core substance is steel, brass or carbon.

11. The invention according to claim 1, wherein said core substance has a high tensile strength.

12. The invention according to claim 1, wherein said coating metal has an initial thickness of about 5 to 20 micrometers.

13. The invention according to claim 1, wherein said coating metal has an initial thickness of 13 to 15 micrometers.

14. The invention according to claim 1, wherein the concentration of said core substance in said admixed layer decreases in a radially outward direction.

15. The invention according to claim 1, wherein said admixed layer has an initial thickness of about 20 to 70 micrometers.

16. A method for forming a wire useful as an electrode tool in an EDM apparatus, comprising:
   depositing a zinc coating of about 15 micrometers thickness on a copper wire core;
   heating the resulting coated wire for about 8 seconds at about 850° C. in an oxidizing atmosphere so as to create a copper-zinc alloy layer of about 45 micrometers thickness on said core, covered by a metal oxide layer on the order of about 1 micrometer thickness; and
   reducing the diameter of the resulting alloy and oxide covered wire so as to reduce the thickness of said alloy layer by about one-half.

17. An electrically conductive wire having a good tensile strength, comprising: a core containing a material having a high tensile strength;
   an intermediate admixed layer covering said core, made of a mixture of said core material and a metal selected from the group consisting of zinc and cadmium, the concentration of said metal in said admixed layer generally increasing in a radially outward direction; and
   a thin outer layer atop said admixed layer made of an oxide of said metal;
   the surface of said wire being hardened by a die-drawing step, conducted to reduce the thickness of said admixed layer by at least 30 per cent.

18. A wire according to claim 17, wherein said core is made of a material selected from the group consisting of copper, brass, steel and carbon.

19. A wire according to claim 17, wherein said admixed layer is made of an alloy of copper and zinc.

20. A wire according to claim 17, wherein the thickness of said admixed layer is in the range between 10 to 35 micrometers.

21. A wire according to claim 17, wherein said metal has an initial thickness of about 5 to 20 micrometers.

22. A wire according to claim 17, wherein said metal has an initial thickness of 13 to 15 micrometers.

23. A wire according to claim 17, wherein the concentration of said core material in said admixed layer decreases in a radially outward direction.

24. A wire according to claim 17, wherein said admixed layer has an initial thickness of about 20 to 70 micrometers.

25. An electrically conductive wire comprising:
   a core comprised of a core material having a high tensile strength;
   an intermediate admixed layer covering said core, comprising a mixture of part of said core material and at least one volatile metal, at least one of said core material and said metal being diffused with the other; and
   a thin outer layer atop said admixed layer, comprising an oxide of said metal;
   said wire being surface hardened by a reduction of the thickness of said admixed layer by about at least 30 percent.

26. The invention according to claim 25, wherein the concentration of said metal in said intermediate admixed layer generally increases gradually in a direction radially outward from said core.

27. The invention according to claim 25, wherein said core material comprises at least one of copper, brass, steel and carbon.

28. The invention according to claim 25, wherein the thickness of said admixed layer is about 10 to 35 micrometers.

29. The invention according to claim 25, wherein said admixed layer comprises an alloy of copper and zinc.

30. The invention according to claim 25, wherein said wire is die-drawn hardened.

31. The invention according to claim 25, wherein said volatile metal is zinc, cadmium, or an alloy thereof.

32. An EDM apparatus incorporating an electrically conductive wire comprising:
- a core comprised of a core material having a high tensile strength;
- an intermediate admixed layer covering said core, comprising a mixture of part of said core material and at least one volatile metal, at least one of said core material and said metal being diffused with the other; and
- a thin outer layer atop said admixed layer, comprising an oxide of said metal;
- said wire being surface hardened by a reduction of the thickness of said admixed layer by about at least 30 percent.

33. An electrically conductive wire comprising:
- a core comprised of a core material having a high tensile strength;
- an intermediate admixed layer covering said core, comprising a mixture of part of said core material and at least one volatile metal, at least one of said core material and said metal being diffused with the other; and
- a thin outer layer atop said admixed layer, comprising an oxide of said metal;
- said wire being surface hardened by a reduction of the thickness of said admixed layer by about at least 30 percent, and said intermediate layer being formed from an initial coating of said volatile metal atop said core about one-third as thick as said intermediate layer.

34. An electrically conductive wire comprising:
- a copper wire core;
- a zinc oxide layer over said core, formed from an initial zinc coating about 15 micrometers thick which is heated for about 8 seconds at about 850° C. in an oxidizing atmosphere so as to yield a zinc oxide layer on the order of about one micrometer thick, and which is thereafter reduced in diameter by reducing said wire in diameter; and
- a copper-zinc alloy layer between said core and said zinc oxide layer, initially about 45 micrometers thick on said core and formed by said heating, which is reduced by about one-half in thickness upon said reduction in diameter of said wire.

* * * * *